United States Patent [19]

Lesgourgues

[11] Patent Number: 4,614,296
[45] Date of Patent: Sep. 30, 1986

[54] DIFFUSION BRAZING PROCESS FOR PIECES OF SUPERALLOYS

[75] Inventor: Jacques Lesgourgues, Corbeil, France

[73] Assignee: Societe Nationale d'Étude et de Construction de Moteurs d'Aviation S.N.E.C.M.A., Evry, France

[21] Appl. No.: 708,103

[22] Filed: Mar. 5, 1985

Related U.S. Application Data

[63] Continuation of Ser. No. 409,285, Aug. 18, 1982, abandoned.

[30] Foreign Application Priority Data

Aug. 26, 1981 [FR] France .................................. 81 16283

[51] Int. Cl.$^4$ ........................... B23P 6/04; B23K 1/04
[52] U.S. Cl. ..................... 228/194; 228/198; 228/263.13; 228/119
[58] Field of Search ............. 228/194, 263.13, 198, 228/119

[56] References Cited

U.S. PATENT DOCUMENTS

| | | | |
|---|---|---|---|
| 2,714,760 | 8/1955 | Boam et al. | 228/263.13 |
| 3,108,861 | 10/1963 | Cape | 228/194 X |
| 3,496,630 | 2/1970 | Duff et al. | 228/194 |
| 3,574,924 | 4/1971 | Dibble | 228/193 X |
| 3,678,570 | 7/1972 | Paulonis et al. | 228/194 |
| 3,692,501 | 9/1972 | Hoppin et al. | 428/678 X |
| 4,005,988 | 2/1977 | Paulonis et al. | 228/194 X |
| 4,008,844 | 2/1977 | Duvall et al. | 228/194 X |
| 4,285,459 | 8/1981 | Baladjanian et al. | 228/119 |
| 4,299,629 | 11/1981 | Haack | 75/251 |
| 4,381,944 | 5/1983 | Smith, Jr. et al. | 228/194 X |

FOREIGN PATENT DOCUMENTS

| | | |
|---|---|---|
| 1218005 | 12/1959 | France . |
| 2132050 | 11/1972 | France . |
| 2192889 | 2/1974 | France . |
| 2296491 | 7/1976 | France . |

OTHER PUBLICATIONS

Duvall, D. S. et al., "TLP Bonding: A New Method for Joining Heat Resistant Alloys," *Welding Journal*, Apr. 1974, pp. 203-214.

Sims, Chester T. et al., editors, "The Superalloys: Vital High Temperature Gas Turbine Materials for Aerospace and Industrial Power," 1972, pp. 596-597.

*Primary Examiner*—Kenneth J. Ramsey
*Attorney, Agent, or Firm*—Bacon & Thomas

[57] ABSTRACT

A diffusion brazing process for superalloy parts is performed on the one hand by the interposition between the pieces to be joined of a joining layer having a composition close to that of the parts and containing a "fluxing" element, which renders it more readily meltable, and on the other hand, a heat treatment effecting the brazing by the melting of the joining layer and its resolidification, by the diffusion of the flux. The process of the invention is characterized, particularly in view of permitting the use of a joining layer of a greater thickness than that of the layers used in the known diffusion brazing processes, in that said joining layer consists of a mixture of a superalloy powder and an alloy powder containing the flux.

8 Claims, 6 Drawing Figures

DIFFUSION BRAZING PROCESS FOR PIECES OF SUPERALLOYS

This application is a continuation, of application Ser. No. 409,285, filed Aug. 18, 1982, now abandoned.

BACKGROUND OF THE INVENTION

The invention concerns a diffusion brazing process for pieces of superalloys based on nickel or cobalt, i.e., refractory alloys having a content by weight of at least 50% nickel or cobalt.

It is to be noted that diffusion brazing is defined as a joining process of the type consisting of placing between the faces of metal pieces to be assembled (of similar composition, a metal joining layer of a similar overall composition but containing further at least one addition element (sometimes called "flux") which renders it more readily meltable than the alloy or alloys of the pieces and which is capable of diffusing in said pieces, so that when an appropriate heat treatment is applied to the assembly of said pieces and the said joining layer, the layer is melted at least partially and then resolidified by the diffusion of the addition element.

It is known to join pieces of superalloys by diffusion brazing, particularly castings. French Pat. No. 2,132,050 describes, for example, the application of a process of this type to the joining of nickel base superalloys. The element to be added of the joining layer must be chosen so that it does not produce embrittling phases during its diffusion into the superalloys. For this reason, elements such as aluminum, titanium and carbon must be eliminated in principle from said joining layer. The latter contains, for example, in percents by weight:

15 Cr; 15 Co; 3 B, rest Ni.

The execution of such a process requires great caution. The joining layer must be as thin as possible, because the thicker it is:

the higher the risk of porosity and the loss of metal, barring the placing of gaskets around the joint and of metal reserves, thereby creating a veritable mold;

the longer the diffusion;

the more the composition and the properties of the pieces to be joined are altered in the vicinity of the joining faces.

However, the thinner the joining layer, the higher the risk of the appearance of joint defects (voids, adhesions, etc.), which imposes the requirement of precision machining the joining surfaces of the pieces and to subject them to joining pressure during the execution of the process.

In actual fact, all of these difficulties are the result of the condition wherein the joining layer melts integrally. More precisely, its liquidus temperature is lower than the solidus temperature of the superalloys of the workpieces. If a joint of excellent quality is desired (to form, for example, a piece of complex configuration by the joining of elementary pieces), the conditions to be observed render it on occasion impossible to find on the market an alloy (in the form of a powder or foil, etc.), the composition of which corresponds effectively to that of the joining layer that must be used.

SUMMARY OF THE INVENTION

The diffusion brazing process of the present invention, intended for the assembly of at least two pieces of nickel or cobalt based superalloys and of related compositions, is itself of the type which consists on the one hand of the interposition between the joining faces of said pieces of a joining layer with an overall composition close to the compositions of said superalloys or of a composition slightly different but with identical properties and which further contains an addition element which renders it more readily meltable than said superalloys, and on the other hand, of subjecting the assembly to diffusion brazing heat treatment. But, it is characterized by said joining layer consisting of an intimate mixture of at least two alloy powders in appreciably unequal proportions, i.e. on the one hand, a superalloy powder in the greater proportion designated the "base powder" containing substantially none of the addition element and, on the other hand, an alloy powder designated the "addition powder" containing at least nickel or cobalt and further the said addition element in a proportion such that the temperature of the liquidus of the alloy of the addition powder is lower than the solidus temperature of the superalloy of the pieces and of the base powder. These addition powders are chosen preferably from among the ternary of quaternary systems. In particular, the Ni, Cr, B and Ni, Co, Si and B systems have excellent wetting properties and avoid, at the usual heat treating temperatures, the formation of insoluble compounds. In this respect, the simultaneous presence of the elements Ni, Cr, Si and B should be avoided.

The following advantages are obtained by these characteristics specifications:

the phenomena of volume expansion during melting and shrinking during solidification affect only the alloy of the addition powder and are attenuated over the entire thickness of the joining layer because of the presence of the grains of the base powder;

after resolidification, the joining layer thus remains compact in itself and its thickness is appreciable (of the order, for example, of several tenths of millimeter to one millimeter), the more so, since during the melting of the addition powder, the liquid phase is retained by capillarity between the grains of the base powder;

regardless of the thickness of the joining layer, the distance to be covered by the addition element to complete diffusion is at the most equal to one-half of the thickness of the grains of the base powder if they are not spherical, or of their radius if they are spherical;

the duration of the diffusion phase of the heat treatment thus depends much less on the thickness of the joining layer than in the processes of diffusion brazing in the prior art;

it is possible to better adjust the chemical composition of the joining zone (after diffusion) by acting on the relative proportions of the base powder and the addition powder, i.e., it is possible in nearly all cases to use a powder mixture available on the market;

it is even possible to use an addition powder the base element of which is different from the base elements of the pieces and of the base powder; it is possible for example to use for the joining of cobalt based superalloys pieces a base powder, the base element of which is cobalt and an addition powder having nickel as its base element;

it is possible to combine or to cummulate the operation according to the invention with a diffusion brazing of the prior art, which makes it possible to treat all possible geometric configurations without the mechanical working of the faces to be joined, particularly if their distance is very small.

Due to its flexibility, the process of the invention may be used advantageously in numerous applications, in particular:

to obtain a piece of complex configuration by joining at least two elementary superalloy pieces;

to fill an accidental cavity (casting defect, fissure) or an inventional cavity (passage hole of a foundry core) of a superalloy piece by means of a plug itself consisting of a mixture according to the invention;

to replace a defective portion of a superalloy part or to join it with a subsidiary element (protuberance, reinforcing rib, etc.).

It should be noted finally that the diffusion brazing process of the invention may even make it possible to effect the simultaneous joining to a first part a second piece consisting of a presintered blank of the mixture itself, while effecting at the same time the compacting of the latter. The presintered blank is placed into contact with the first part; the blank consists of the mixture. The diffusion brazing treatment performs simultaneously on the one hand, the compacting and homogenization of the blank, and on the other hand, its joining with the first piece. The joining layer consists of the surface zone of the blank in contact with the first piece. This disposition applies essentially to the joining to an already machined piece of a subsidiary element of a simple configuration (boss or plug), the presintered blank of which is very low in cost.

BRIEF DESCRIPTION OF THE DRAWINGS

The invention will become more apparent from the supplemental description hereinafter, which is in reference to the drawings attached hereto, wherein.

DESCRIPTION OF THE PREFERRED EMBODIMENTS

Figure 1:
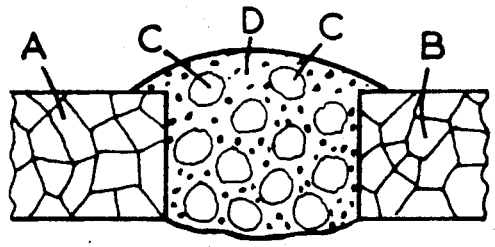
FIGS. 1, 2 and 3 are diagrams illustrating the different physico-chemical states of the joining layer during the execution of the process of the invention.

FIG. 1 shows schematically the structure of a portion of a piece-joining layer assembly prior to the execution of the diffusion brazing treatment. A portion of the wall of two pieces A and B to be joined and the powder mixture are seen: the grains C of the base powder and the grains D of the addition powder.

Figure 2:
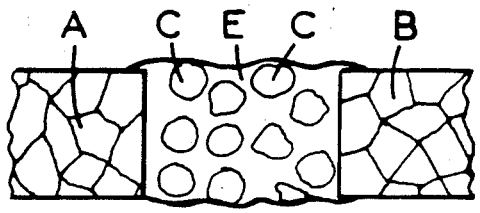
Figure 6:
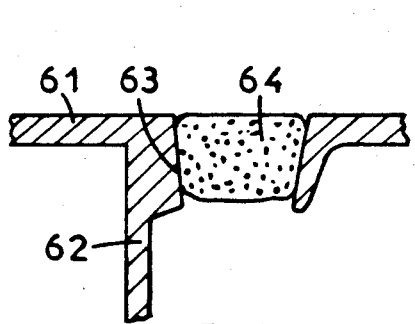
FIG. 6 is a section of a portion of a hollow turbine blade showing the sealing of a passage orifice for core prints by a plug by means of the process of the invention.

FIG. 2 shows the structure when the grains D are fused. The liquid phase E which they produced wets the walls A and B and the grains C. It is retained by capillarity, by virtue of the small dimensions of the grains.

Figure 3:
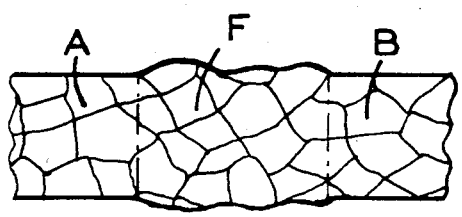
Figure 5:
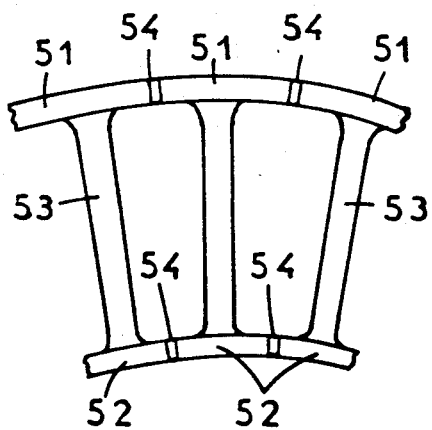
FIG. 5 is a front elevation of a section of turbine blades obtained by the joining of elementary blades by means of the process of the invention.
Figure 4:
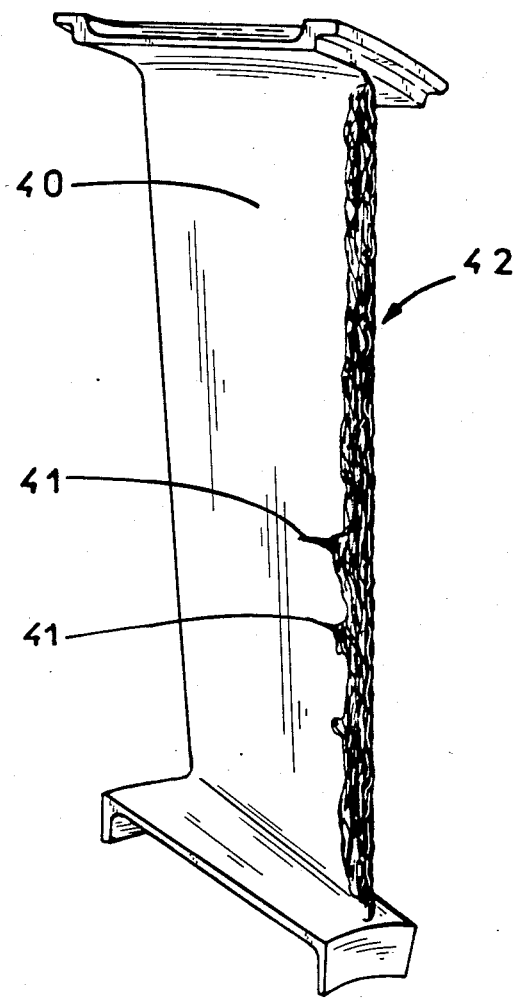
FIG. 4 is a view of a stationary turbine blade reconditioned by means of the process of the invention.

FIG. 3 shows the structure when the diffusion treatment has been conducted correctly. A solid intermediate layer F remains; it is metallographically homogeneous and joined by diffusion to the walls of the pieces A and B, as indicated in the drawing by the dot-and-dash lines outlining the boundaries of these walls.

As the result of these physical and metallurgical phenomena occurring during the operation, the final proportion of porosity may be practically zero.

As mentioned hereinabove, the figures described hereinafter are relative to examples of the application of the process according to the invention. The description of each of these examples will mention only essential dispositions, i.e.:

the nature of the superalloy or superalloys, indicated by the standardized symbols in general use;

the nature of the superalloy of the base powder and its grain size distribution;

the chemical composition (content in percents by weight) of the addition powder and its grain size distribution;

the respective proportions of the two powders;

the thickness of the joining layer obtained by means of the mixture of these powders; and finally, the temperatures and durations of the heat treatment cycle of diffusion brazing.

At this point certain dispositions applicable to these examples will be set forth; they will not be repeated, because they are already known to those skilled in the art.

The placing of the powder mixture constituting the joining layer may be effected in different ways. If the joining faces of the pieces are flat and horizontal, the mixture may be interposed in the free state. However, it is preferable in most cases to add an organic binder which disappears by pyrolysis in the course of the heat treatment and which is chosen so as not to leave a carbonaceous residue. It is possible, for example:

to introduce the joining layer in the form of a fluid paste resulting from the dispersion of the powder mixture in a solution of acrylic resin in its monomer state;

interpose it in the form of a foil or a strip obtained by rolling a dispersion of said powder mixture in an acrylic resin.

Concerning the grain size distribution of the base and addition powders, it obviously should be chosen so that the largest dimension of the grains does not exceed the clearance between the pieces to be joined (this controls the thickness of the joining layer). The advantage of using an addition powder of dimensions equal to or finer than the base powder, should, however, be mentioned, as in this manner the mixture will be more compact. The finest grains will locate between the coarsest grains, which may even contact each other if the proportion of grain size distributions is sufficient and the proportion of the addition powder is not too high. Porosities then become extremely rare.

It may be necessary to follow the diffusion brazing treatment by a resolution treatment or an annealing treatment, which is not described because it is not part of the present invention.

In order to eliminate residual porosities, it is possible to follow the diffusion brazing treatment (preferably effected in a vacuum) by a treatment of compacting under pressure. But, the diffusion brazing treatment may also be effected under isostatic pressure in an inert atmosphere, even though the execution then requires a treating equipment that is more complex and more expensive.

Finally, without exception, the operations of cleaning or pickling the surfaces will not be described, because they are of a known type.

EXAMPLE 1 (FIG. 4)

The example concerns a stationary turbine blade 40, precision die cast of a cobalt base alloy KC25NW, marketed under the name of HS31, damaged by cracking or thermal fatigue. To recondition the part, the trailing edge was repaired to reshape the profile.

The repair work was effected according to the following fundamental sequence:

filling the finest cracks 41 with an addition metal based on NiCrB in the form of paste consisting of a prealloyed powder and a volatile binder;

melting the addition metal and filling the cracks by means of a passage at 1200° C. in 15 minutes in a vacuum;

depositing a material according to the invention consisting of a powder of a cobalt base alloy and the powder of the addition metal of the type NiCoSiB, onto the damaged parts 42 of the trailing edge;

melting the addition metal by passage at 1200° C. in 15 minutes in a vacuum;

inspection of the geometric aspect of the repair work;

diffusion treating at 1200° C. for 4 hours in a vacuum.

This example thus illustrates the interesting case wherein the base element of the addition powder (here nickel) is different from the base element (here cobalt) of the base powder and of the pieces.

EXAMPLE 2 (FIG. 5)

A section of three blades of a BP turbine is to be assembled by joining the head flanges 51 and the roots 52 of three elementary blades 53, made of the alloy NK15CADT (commercially known as RENE 77). The joining layers 54, approximately 100 microns thick, consist of a mixture of the following powders:

base powder: weight proportion 75%, grain size less than 100 microns, alloy NK17CDAT (commercially known as Astroloy);

addition powder: weight proportion 25%, grain size less than 40 microns, containing 15 Cr, 3.5 B, rest Ni (melting temperature 1055° C.).

The diffusion brazing heat treatment comprises essentially:

heating in approximately 3 hours to 1200° C.;
holding for 12 minutes at 1200° C.;
holding for 4 hours at 1190° C.;
lowering the temperature in approximately 2 hours from 1190° C. to 540° C.

The two alloy powders are available on the market.

EXAMPLE 3 (FIG. 6)

This example concerns the sealing in the flange 61 of a hollow turbine blade 53 made of the alloy NK15CADT, of the orifice 63 which was provided for the passage of the core holder. The conventional solution consists of machining the orifice to lodge into a brazed stainless steel sphere.

The solution of the invention consists of inserting a presintered blank of a plug in the form of 64, the blank consisting of a mixture of the following alloy powders:

base powder: weight proportion 75%, grain size less than 160 microns, alloy NK17CDAT;

addition powder: weight proportion 25%, grain size less than 40 microns, containing 17 Co, 4 Si, 2.7 B, rest Ni (solidus temperature 960° C.).

The blank is introduced into the orifice and the assembly is subjected to a rapid diffusion brazing heat treatment comprising essentially a holding period of 15 minutes at 1200° C. This treatment makes it possible to effect simultaneously the sintering of the blank of the plug 64 and its joining to the walls of the orifice 63. The joining layer very simply consists of the surface layers of the blank in contact with the walls of the hole. It is unnecessary to machine the hole if the wall is suitably pickled.

In addition to the fact that the base powder and the addition powder are available on the market, the advantages of this solution in the final analysis are the following:

very low cost of the blank;
effecting the joint with the raw, as-cast surfaces.

This solution is applicable whenever a portion of a supplemental piece, such as a rib or a boss, etc. is to be joined to an existing part.

It is possible to indicate numerous other examples of the use of the process of the invention, but those given are sufficient to show the variety of possible applications.

In a general manner, the experiments performed to develop the invention have shown that when the parts to be joined are cobalt base superalloys, the proportion of the addition powder in the powder mixture should preferably be between 5% and 40% and if they are made of a nickel base superalloy, this proportion should preferably be between 5% and 25%.

I claim:

1. A process for diffusion brazing a layer of material between faces defined by an article formed by nickel or cobalt base superalloys comprising the steps of:
   (a) forming the layer of material from a mixture having properties identical to the superalloys and formed of at least two alloy powders in appreciably unequal proportions, the two alloy powders comprising (i) a base powder of NK17CDAT (Astroloy) forming approximately 75% by weight of the mixture and (ii) an addition powder forming approximately 25% by weight of the mixture, the addition powder being a Ni B Cr alloy such that the liquidus temperature of the addition powder is lower than the solidus temperature of the base powder and the article;
   (b) placing the layer of material between the faces of the article;
   (c) heating the assembly to a temperature sufficient to melt the addition powder, but not the base powder or the article, the melted addition powder being retained in the base powder by capillary action; and,
   (d) subjecting the assembly to a diffusion brazing heat treatment.

2. The process according to claim 1 wherein the addition powder alloy comprises approximately 15% Cr, 3.5% B and the rest Ni.

3. The process according to claim 2 wherein the base powder has a grain size of less than 100 microns and the alloy powder has a grain size of less than 40 microns.

4. The process according to claim 3 wherein the superalloy comprises NK15CADT (Réne 77).

5. The process according to claim 3 wherein the diffusion brazing treatment comprises:
   (a) heating the assembly for approximately 3 hours to 1200° C.;
   (b) holding the temperature at 1200° C. for approximately 12 minutes;
   (c) reducing the temperature to approximately 1190° C. and holding at this temperature for approximately 2 hours; and,
   (d) lowering the temperature in approximately 2 hours from approximately 1190° C. to approximately 540° C.

6. A process for diffusion brazing a layer of material between faces defined by an article formed by nickel or cobalt base superalloys comprising the steps of:
(a) forming the layer of material from a mixture having properties identical to the superalloys and formed of at least two alloy powders in appreciabely unequal proportions, the two alloy powders comprising (i) a base powder of NK17CDAT (Astroloy) forming approximately 75% by weight of the mixture and (ii) an addition powder forming approximately 25% by weight of the mixture, the addition powder being an alloy of Ni Co Si B, such that the liquidus temperature of the addition powder is lower than the solidus temperature of the base powder and the article;
(b) placing the layer of material between the faces of the article;
(c) heating the assembly to a temperature sufficient to melt the addition powder, but not the base powder or the article, the melted addition powder being retained in the base powder by capillary action; and,
(d) subjecting the assembly to a diffusion brazing heat treatment.

7. The process according to claim 6 wherein the addition powder comprises an alloy having approximately 17% Co, 4% Si, 2.7% B and the rest Ni.

8. The process according to claim 7 wherein the base powder has a grain size of less than 160 microns and the addition powder has a grain size of less than 40 microns.

* * * * *